(12) United States Patent
Hsu et al.

(10) Patent No.: US 7,397,182 B2
(45) Date of Patent: Jul. 8, 2008

(54) DISPLAY MODULE USING BLUE-RAY OR ULTRAVIOLET-RAY LIGHT SOURCES

(75) Inventors: Chih Ming Hsu, Taoyuan (TW); Yuh Wen Lee, Taoyuan (TW)

(73) Assignee: Arima Optoelectronics Corp., Taoyuan County (TW)

( * ) Notice: Subject to any disclaimer, the term of this patent is extended or adjusted under 35 U.S.C. 154(b) by 582 days.

(21) Appl. No.: 11/151,421

(22) Filed: Jun. 14, 2005

(65) Prior Publication Data
US 2006/0279674 A1 Dec. 14, 2006

(51) Int. Cl.
*H01J 1/62* (2006.01)
(52) U.S. Cl. .................................. 313/512; 313/498
(58) Field of Classification Search ............... 313/498, 313/506, 512, 110
See application file for complete search history.

(56) References Cited

U.S. PATENT DOCUMENTS

2002/0146518 A1* 10/2002 Kusume et al. ............ 428/1.33

* cited by examiner

*Primary Examiner*—Vip Patel
(74) *Attorney, Agent, or Firm*—Rosenberg, Klein & Lee

(57) ABSTRACT

The present invention discloses a display module using blue-ray or ultraviolet-ray light sources to excite RGB fluorescent powders to emit light, which comprises a light guide plate, at least one blue-ray or ultraviolet-ray light source, a diffuser plate, a liquid crystal layer and a fluorescent-powder excited layer. The blue-ray or ultraviolet-ray light sources emit a short-wavelength light with the wavelength ranging from 360 to 460 nm; the light guide plate will guide the short-wavelength light to the diffuser plate; the diffuser plate will further diffuse the short-wavelength light; the diffused short-wavelength light will pass through the liquid crystal layer and reach the fluorescent-powder excited layer where the short-wavelength light excites the fluorescent powder to emit light. The excited layer has multiple grids where RGB fluorescent elements are disposed, and each grid has only one single-color fluorescent element. The liquid crystal layer can determine whether the short-wavelength light diffused by the diffuser plate is allowed to pass through a specified grid to excite the fluorescent element to emit light. The present invention combines the advantages of low voltage as in LCD and high brightness as in self-lighting PDP, and the present invention has the benefits of higher brightness, less light loss, and reduced cost.

7 Claims, 5 Drawing Sheets

DISPLAY MODULE USING BLUE-RAY OR ULTRAVIOLET-RAY LIGHT SOURCES

BACKGROUND OF THE INVENTION

1. Field of the Invention

The present invention relates to a display module using blue-ray or ultraviolet-ray light sources, particularly to a display module using blue-ray or ultraviolet-ray light sources to excite RGB fluorescent powders to emit light.

2. Description of the Related Art

In a Liquid Crystal Display (LCD) panel, a backlight module in the rear side emits light, and the light is uniformly spread to the front side via the backlight module and an assemblage of prisms; the liquid crystal molecules will align according to received image signals, which can determine whether the light to pass through or not.

The backlight module is one of the key components of LCD panel. As liquid crystal itself does not emit light, sufficient brightness and uniformly distributed light source, which enables the LCD panel to present pictures, is provided by a backlight module.

LCD panel has been universally used in monitors, notebooks computers, digital cameras, projectors, etc., which have high growth potential, and therefore, the demand for the backlight module and its related elements and parts also increases persistently. The growth of the demand for backlight module is primarily motivated by the demand for large size panels used in notebook computers, monitors, etc., wherein low price is the stimulating factor of the demand.

In a Plasma Display Panel (PDP), inertial gases or a mercury vapor are filled into an evacuated tube, and a voltage is applied to create an isoionic effect, and an ultraviolet ray is thus emitted to excite RGB fluorescent elements to generate the trichromatic colors; the exciting time is used to control brightness.

A PDP comprises a front glass plate and a rear glass plate. The front glass plate has transparent ITO holding electrodes and conductivity-enhancing bus electrodes. A transparent dielectric layer overlays the electrodes, and MgO further overlays the dielectric layer in order to protect the dielectric layer against ion impact. The rear glass plate has address electrodes (i.e. data electrodes), a dielectric layer, and strip-like barrier ribs. RGB fluorescent materials are printed inside each barrier rib. Inertial gases Ne and Xe are filled into the space between two glass plates, and then, two glass plates are sealed, with the pressure thereinside at a high vacuum state of only several hundred Torr.

PDP has the advantages of high contrast, mature technology, no residual image, capability of implementing a large-size panel, and having a wide viewing angle. However, PDP is very expensive and consumes too much power, and the effect of the transparent ITO is not well enough. A voltage is used to create an isoionic effect to generate an ultraviolet ray, and the spectrum thereof is too wide; thus, the performance is unstable.

The top benefit of LCD is a very low radiation, and in comparison with PDP, LCD also consumes less power. However, if LCD is compared with CRT by the price per inch of the panel, a LCD panel is much more expensive than a traditional CRT TV.

In re those discussed above, the present invention provides a display module using blue-ray or ultraviolet-ray light sources to overcome the problems.

SUMMARY OF THE INVENTION

The primary objective of the present invention is to provide a display module using blue-ray or ultraviolet-ray light sources to directly excite RGB trichromatic colors, wherein a blue ray or an ultraviolet ray is used as the light sources of the backlight module in order to have more stable light sources; the blue ray or ultraviolet ray is used to excite the single-color fluorescent element on each grid in order to have a higher brightness and a less light loss.

Another objective of the present invention is to provide a display module using blue-ray or ultraviolet-ray light sources, wherein only one single-color fluorescent element is disposed inside one grid so that the cost can be reduced, in contrast with the conventional technologies that multiple fluorescent elements are disposed inside one grid.

Yet another objective of the present invention is to provide a display module using blue-ray or ultraviolet-ray light sources, which combines the advantages of LCD and PDP.

To achieve the aforementioned objectives, the present invention proposes a display module using blue-ray or ultraviolet-ray light sources, which comprises a light guide plate, and blue-ray or ultraviolet-ray light sources installed thereon. The blue-ray or ultraviolet-ray light sources are used to emit a short-wavelength light with the wavelength ranging from 300 to 460 nm. The short-wavelength light is guided by the light guide plate to a diffuser plate installed thereon. Then, the short-wavelength light is diffused by the diffuser plate. A liquid crystal layer and an excited layer are disposed on the diffuser plate. The excited layer has multiple grids, and fluorescent elements of RGB trichromatic colors are disposed on those grids, and each grid has only one single-color fluorescent element. The short-wavelength light diffused by the diffuser plate and passing through the liquid crystal layer will excite the fluorescent elements to emit light.

To enable the objectives, technical contents, characteristics, and accomplishments of the present invention to be more easily understood, the embodiments of the present invention are to be described below in detail in cooperation with the attached drawings.

DETAILED DESCRIPTION OF THE INVENTION

Figure 1:
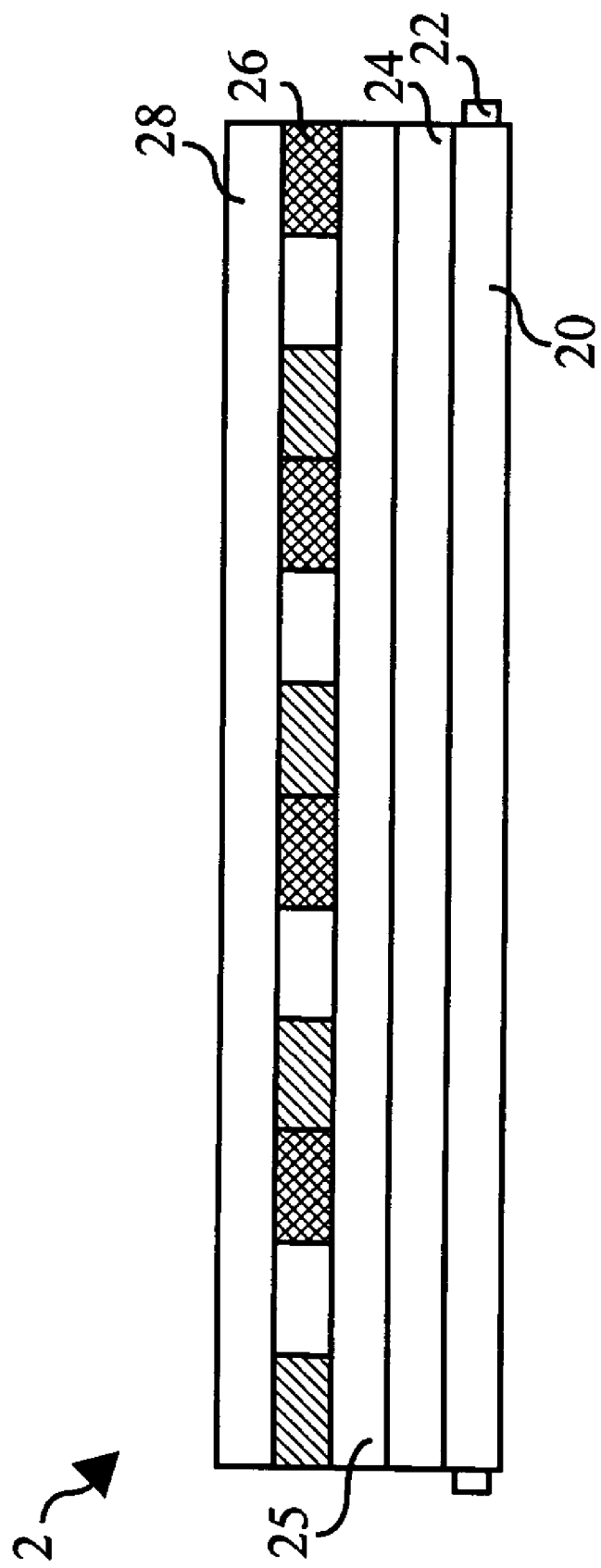
FIG. 1 is a section view of the structure according to one aspect of the present invention.
Figure 2:
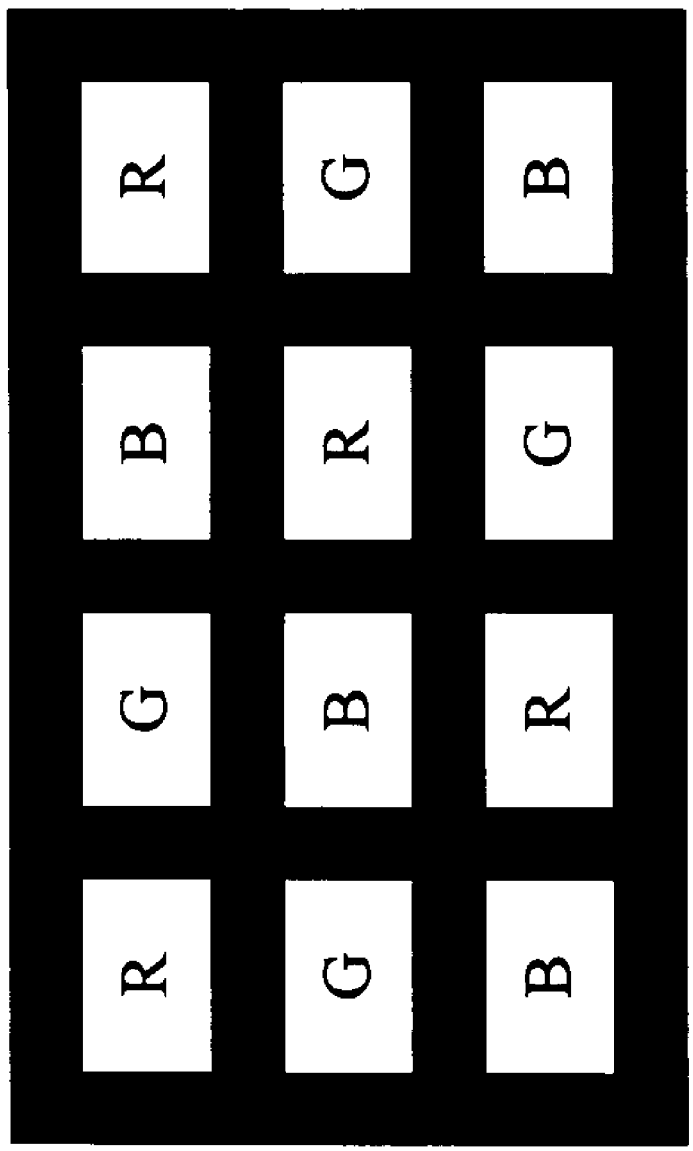
FIG. 2 to FIG. 5 are schematic diagrams showing the grid arrangements of fluorescent elements according to the embodiments of the present invention.
Figure 3:
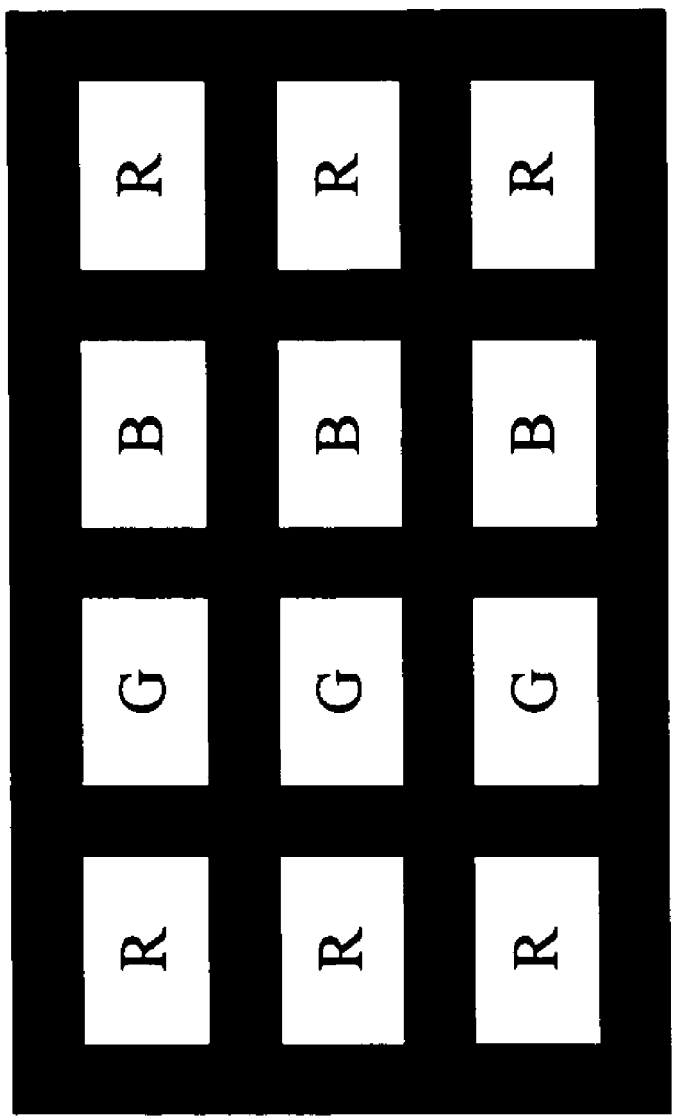
Figure 4:
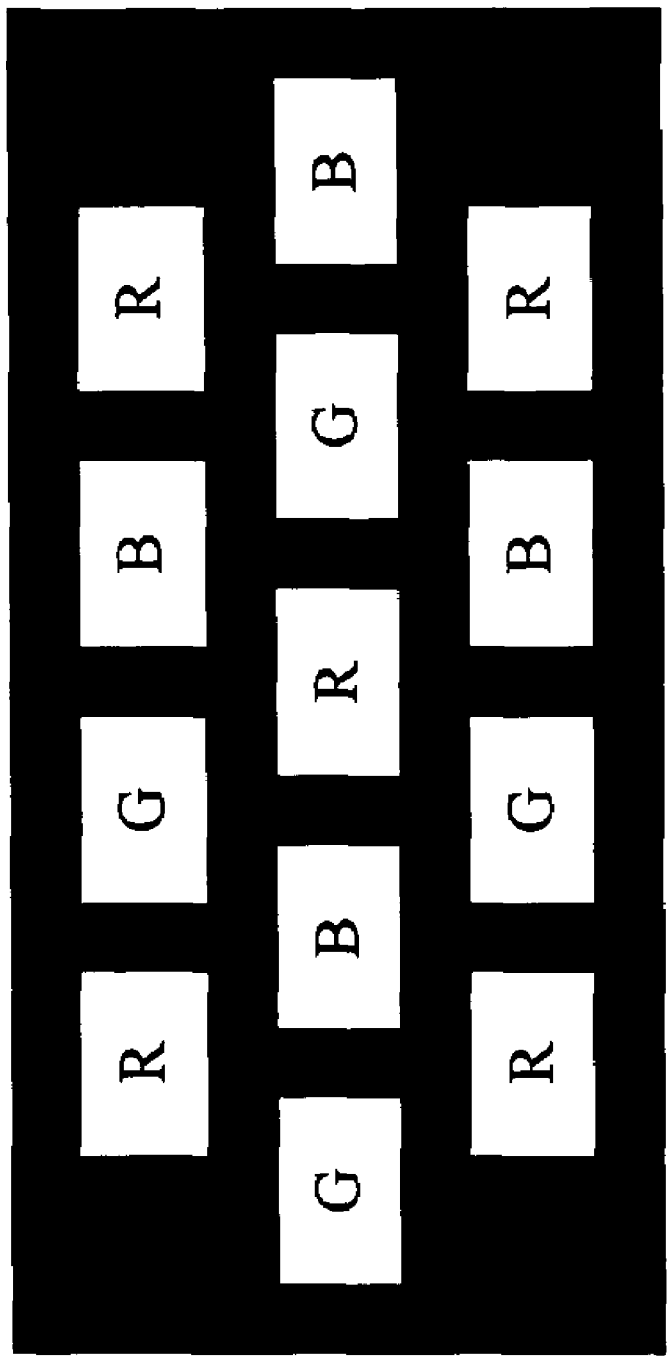
Figure 5:
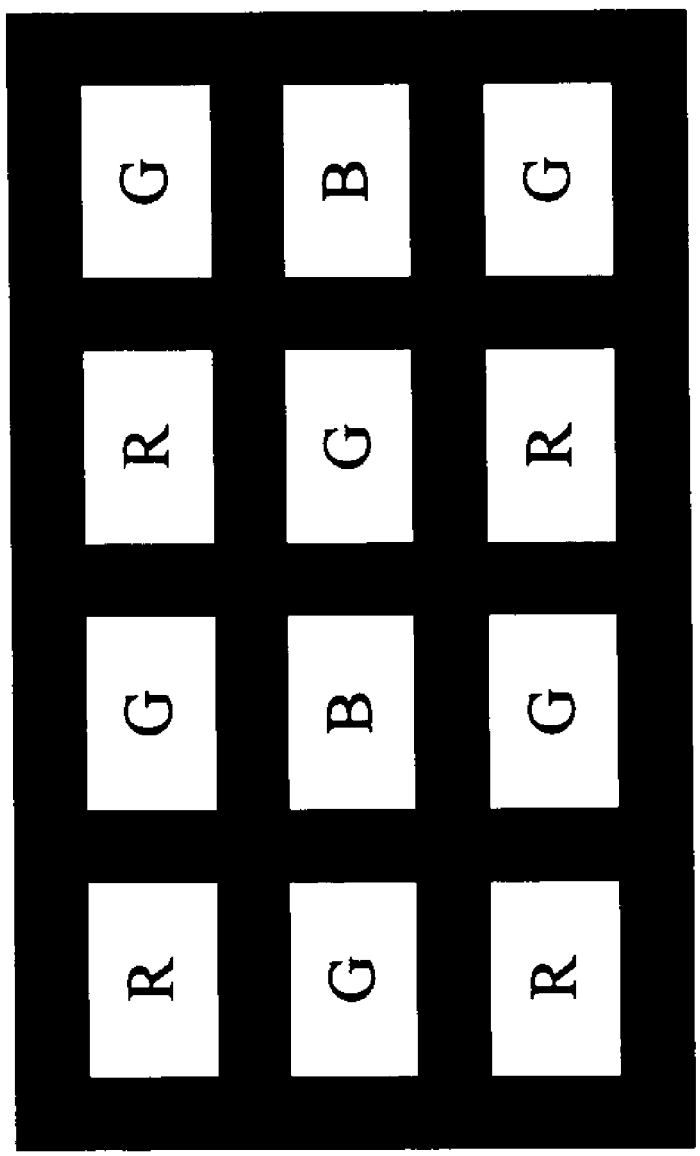

Refer to FIG. 1 a section view according to one aspect of the display module using blue-ray or ultraviolet-ray light sources of the present invention. The display module 2 using blue-ray or ultraviolet-ray light sources comprises a light guide plate 20, and multiple blue-ray or ultraviolet-ray light sources 22 are installed on the light guide plate 20. The light sources 22 are used to emit a short-wavelength light with the wavelength ranging from 300 to 460 nm. A diffuser plate 24 is installed on the light guide plate 20; a liquid crystal layer 25 and an excited layer 26 are further installed on the diffuser plate 24. The excited layer 26 has multiple grids, and fluorescent elements of the trichromatic colors red (R), green (G), and blue (B) are disposed on those grids, and each grid has only one single-color fluorescent element. The short-wavelength light is guided by the light guide plate 20 to the diffuser plate 24, and then, the short-wavelength light is diffused by the diffuser plate 24. The liquid crystal layer 25 is used to determine whether the short-wavelength light is allowed to pass through a specified grid. The short-wavelength light diffused by the diffuser plate 24 and passing through the liquid crystal layer 25 will excite the fluorescent elements to emit light. Further, a screen plate 28 can be installed on the excited layer 26 in order to filter the harmful short-wavelength light.

The blue-ray or ultraviolet-ray light sources 22 can be light emitting diodes (LED) emitting a short-wavelength light with the wavelength ranging from 300 to 460 nm. The light emitted by the blue-ray or ultraviolet-ray LED has a shorter wavelength, which can enhances the energy-transition efficiency of the fluorescent elements and can also promote the illumination obviously. In addition to being installed on a lateral side of the light guide plate 20 as shown in FIG. 1, the blue-ray or ultraviolet-ray light sources 22 can also be installed on the bottom of the light guide plate 20.

The fluorescent elements have red (R), green (G), and blue (B) colors. The colored grids can be arranged in diversified patterns, such as a mosaic pattern, a triangular pattern, a strip pattern, etc., as shown in from FIG. 2 to FIG. 5. It is to be noted that each grid has only one single-color fluorescent element, which can reduce the cost, and which can also enable the individual fluorescent element inside each grid to be 100% excited so that the brightness can be promoted.

The present invention proposes a display module using blue-ray or ultraviolet-ray light sources, which uses a blue ray or an ultraviolet ray as the light sources of the backlight module. The blue-ray or ultraviolet-ray light source has the advantage of higher stability. In the present invention, only one single-color fluorescent element is excited by the blue-ray or ultraviolet-ray light sources in each grid, so that the light loss is reduced and the brightness is promoted. In the present invention, each grid has only one single-color fluorescent element, so that the cost is reduced, in contrast with the conventional technologies that multiple fluorescent elements are disposed inside one grid. Further, the present invention also combines the advantages of LCD and PDP.

The embodiments described above are only to clarify the present invention to enable the persons skilled in the art to understand, make, and use the present invention but not to limit the scope of the present. Any equivalent modification or variation according to the spirit of the present invention disclosed herein is to be included within the scope of the present invention.

What is claimed is:

1. A display module using blue-ray or ultraviolet-ray light sources, comprising:
   a light guide plate;
   at least one blue-ray or ultraviolet-ray light source, installed on said light guide plate, and emitting a short-wavelength light with the wavelength ranging from 300 to 460 nm, which is guided by said light guide plate;
   a diffuser plate, installed on said light guide plate, and used to diffuse said short-wavelength light guided by said light guide plate;
   a liquid crystal layer, installed on said diffuser plate; and
   an excited layer, installed on said diffuser plate, and having multiple grids;
   wherein fluorescent elements of at least two colors are disposed on said multiple grids, and each said grid has only one single-color fluorescent element, and said short-wavelength light diffused by said diffuser plate and passing through said liquid crystal layer will excite said fluorescent elements to emit light.

2. The display module using blue-ray or ultraviolet-ray light sources according to claim 1, wherein said blue-ray or ultraviolet-ray light sources are light emitting diodes emitting a short-wavelength light with the wavelength ranging from 300 to 460 nm.

3. The display module using blue-ray or ultraviolet-ray light sources according to claim 1, wherein said blue-ray or ultraviolet-ray light sources are installed on the bottom of said light guide plate.

4. The display module using blue-ray or ultraviolet-ray light sources according to claim 1, wherein said blue-ray or ultraviolet-ray light sources are installed on a lateral side of said light guide plate.

5. The display module using blue-ray or ultraviolet-ray light sources according to claim 1, wherein said fluorescent elements are made of red, green, or blue fluorescent powder separately.

6. The display module using blue-ray or ultraviolet-ray light sources according to claim 1, wherein said fluorescent elements of different colors are arranged in a mosaic pattern, a triangular pattern, or a strip pattern.

7. The display module using blue-ray or ultraviolet-ray light sources according to claim 1, which further comprises a screen plate installed on said excited layer.

* * * * *